Jan. 21, 1958 M. P. REHORN 2,820,395
STEREOSCOPIC VIEW DETECTORS
Filed June 22, 1954 2 Sheets-Sheet 2

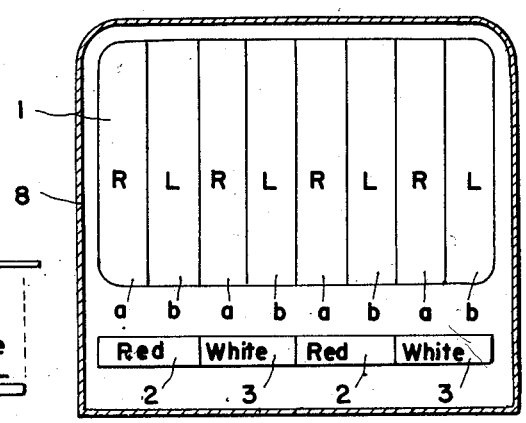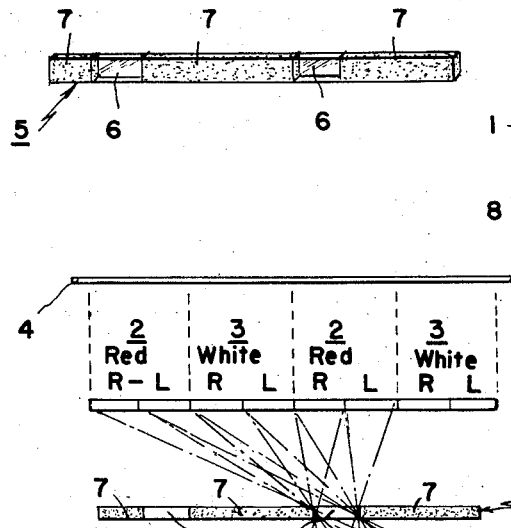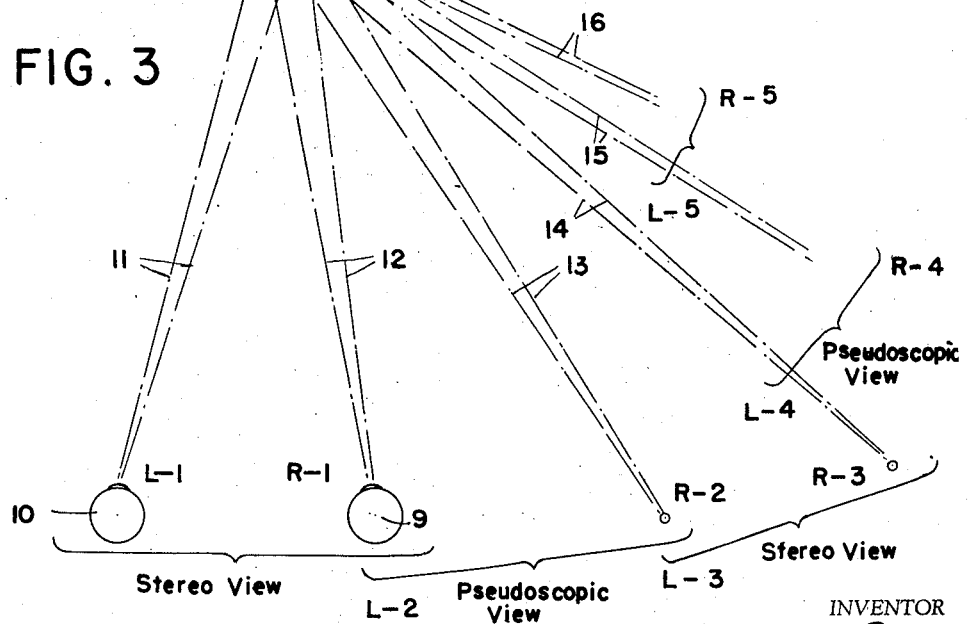

INVENTOR
Miles P. Rehorn

United States Patent Office 2,820,395
Patented Jan. 21, 1958

2,820,395
STEREOSCOPIC VIEW DETECTORS
Miles Parker Rehorn, Apple Creek, Ohio
Application June 22, 1954, Serial No. 438,481
6 Claims. (Cl. 88—29)

This invention is related to various methods of "free vision" stereoscopic viewing, that is methods of viewing a stereoscopic image without the use of personalized aids such as goggles or lenses. Its relation to such methods lies in its use in cooperation with them in assisting the observer in detecting or locating the stereo view in preference to mixed or pseudoscopic views.

There are some very satisfactory "free vision" methods available. But some of the most practical of them, due to the fact that whatever the right eye sees in a given position, the left eye will see when it moves to the same position, have the disadvantage of mixed and pseudoscopic views. That is, if the right eye in a given position sees a right eye image, then when the left eye moves to that position it is also going to see the same right eye image. And when the left eye sees the right eye image, this means that the right eye will see a left eye image, which results in the pseudoscopic view. Also, as the eyes are changing their positions as an observer is moving his head either to right or left, mixed views are seen until either the true stereo view or the objectionable pseudoscopic view is reached. These mixed views are also objectionable.

The objectionable nature of these mixed and pseudoscopic views lies not so much in the fact that the observer is unable to see the stereoscopic view in every position his eyes may assume in the horizontal plane, but rather in the inconvenience and confusing experience of having to examine all of the ever-changing views and decide where to stop, and which is the true stereoscopic view. Some people have great difficulty in separating the true stereo view from the mixed and pseudoscopic view. This is especially true of inexperienced persons or of those who have a muscular defect of the eyes which requires their exerting considerable effort in order to see the stereoscopic view even when their eyes are in the proper position. Also those who have poor or no vision at all in one eye, and who have to be satisfied with only two-dimensional views, while having the advantage of being able to satisfactorily observe such two-dimensional views in either the position where those with normal vision would see the stereo view or in that in which the pseudoscopic view would normally be observed, yet they are still required to reject the mixed views.

The object of this invention is to eliminate all of these inconveniences and disadvantages by providing a simple and practical auxiliary device which enables those with normal vision to easily find any of the positions in which the true stereoscopic view may be observed (and those with good vision in only one eye to find the positions in which the two-dimensional view may be observed) without even looking at the image.

One may still receive a satisfactory general impression of the view before he settles down to limit his eyes to only the stereoscopic view; for example when one enters a room where stereoscopic views are being projected or where a three-dimensional television scene is being viewed. But once seated he has only to look at the stereo view detector featured in this specification in order to quickly find the desired position. Then when his eyes return to the image while his head maintains the acquired position he immediately sees the desired view.

Also if lenticulated screens are utilized in the viewing process in the manner disclosed in my co-pending application Serial No. 339,566, filed March 2, 1953, "Stereoscopic Viewing System," this acquired position is by no means rigid or critical but considerable latitude of horizontal movement is provided before losing the acquired view. This feature, along with the stereo view detector, provides a highly practical system which is admirably applicable to theater motion pictures (either indoor or drive-in), theater television, amateur or professional photography (stills or motion pictures) and to industrial or commercial television or advertising displays.

Referring to the figures of the drawings:

Fig. 1 is a diagrammatic front view showing a stereoscopic image and part of the detector device (herein disclosed) as they may be combined in (1) a stereoscopic television cabinet, (2) a viewer, or (3) a motion picture or still projection screen.

Fig. 2 shows another part of the detector device part of which is indicated in Fig. 1.

Fig. 3 is a diagrammatic plan view of one form of the device showing its relation to an image comprising right eye strips alternating with left eye strips and its relation to the eyes of an observer.

Figure 4:
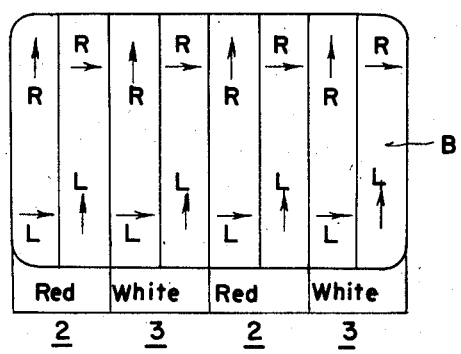
Fig. 4 shows another type stereoscopic image and a portion of a detector device similar to that shown in Fig. 1. Here the said portion of the detector device is next to the image rather than spaced from it as in Fig. 1.

The device set forth in the subsequent disclosure is adapted to operate with any free vision stereoscopic system which incorporates the following specified relationships between image and viewing screen: The viewing screen is in a plane parallel with that of the image plane and is spaced from the image plane such a distance, and from the viewpoint of an observer such a distance that the angle from a point at the image plane subtended by the eyes of an observer approximates the angle from said point that is subtended by the horizontal width of one (or any odd numbered adjacently arranged group) of the unit optical elements of the viewing screen, while at the same time the widths of the unit stereoscopically related image elements are so proportioned to the widths of the said optical elements of the viewing screen that the angle from the pupil of either eye of an observer which is subtended by the horizontal width of one of the said optical elements of the viewing screen will likewise be approximately subtended by the horizontal width of one of the said image elements.

However if a lenticular screen comprises the viewing screen and the image is of the type shown in Fig. 1, where right eye image elements alternate with left eye image elements, then the relationship between viewing screen and image plane will differ from that just disclosed only in that instead of one image element being subtended by the angle from the pupil of the eye of an observer which subtends a single lenticle (which in this case is an element of the viewing screen) two image elements will be subtended by said angle.

Referring to Fig. 1:

Here a stereoscopic image 1 comprising right and left eye image elements *a* and *b* which alternate with respect to each other, as indicated by the letters R and L, is shown. Also in the same plane (either below or above the image elements *a* and *b*, and preferably below as shown) is a row of light transmitting elements 2 and 3, each of which is twice the width of a given image element *a* or *b*. Also each light transmitting element 2 and 3 coincides vertically with a pair of the image elements. The elements 2 transmit red light, and the elements 3 transmit white light. This light-transmitting characteristic of the said elements may be accomplished in various ways. The preferable one is for the elements 2 to be made of red transparent or translucent material such as red cellophane or to comprise a red transparent or translucent dye or paint, and the elements 3 to be transparent or translucent spaces through which light may pass. If the elements 2 and 3 are transparent, then behind the elements 2 and 3 will be a translucent light-diffusing screen 4 (not shown in Fig. 1 but shown in Fig. 3) of such a material as (for example) flashed opal glass. If desired, this light-diffusing screen may serve as the base which contains or supports the red elements 2 and the white elements 3. If the elements 2 and 3 are translucent, then translucent screen 4 may be omitted. Both the image and the light-transmitting elements are shown enclosed within a television cabinet or other viewing cabinet 8. A light source (which may be a light bulb, daylight or identical with the light source for the image) furnishes light to the said light transmitting elements.

Fig. 2 shows a grating 5 with transparent and opaque elements 6 and 7. This grating will preferably occupy the same plane as the conventional viewing screen for viewing such stereoscopic images. (However by altering the widths of the elements 6 and 7 and correspondingly the widths of the elements 2 and 3 of Fig. 1, other planes may satisfactorily be occupied by said elements 6 and 7. The same is conversely true for the elements 2 and 3 of Fig. 1.) The opaque elements 7 (shaded) are three times the width of the elements of the viewing screen, while the elements 6 are equal to the width of a given viewing screen element.

Referring to Fig. 3, the grating 5 of Fig. 2 is shown positioned before the light transmitting elements 2 and 3 (Fig. 1) and spaced from them. The distance of the spacing will be identical with that of the said viewing screen from the image.

Also the grating will be positioned before elements 2 and 3 with such horizontal adjustment that, when the right eye 9 of an observer is in position to see the right eye stereoscopic view and the left eye 10 of an observer is in position to see the left eye stereoscopic view, both the right and left eyes looking through the transparent elements 6 of the grating 5 will see either all red or all white. If the grating 5 is so positioned with respect to the elements 2 and 3, then when an observer moves his head either to the right or left from the correct position, or approaches the image in a wrong position he will see part red and part white (or pink). Therefore when an observer sees part red and part white (or pink) through the transparent elements of the grating 5, he will immediately know that he is in a wrong position and will move his head to a position where he will see either only true red or true white.

Radial lines 11 and 12 indicate the path of sight of the right and left eyes 9 and 10 respectively of an observer as he looks through a given transparent element 6 of the grating 5 from positions R-1 and L-1. R-1 indicates the right eye position and L-1 indicates the left eye position while the brace enclosing R-1 and L-1 and labeled "Stereo View" indicates the first position in which an observer may see the true stereoscopic view. In this position, as shown in the figure with respect to the stereo view detector, he sees only true red since both the right and left eyes see only portions of the red light transmitting elements 2. This will hold true with all of the transparent elements 6 of the grating 5; only red elements 2 will be seen in this position. But as the observer moves his head to the right a little, white will begin to mix with the red until he reaches the position indicated by the brace enclosing L-2 and R-2 where the eyes then follow radial lines 12 and 13 respectively, and the left eye sees half of a red light transmitting element 2 and the right eye sees half of a white light transmitting element 3. This position is labeled "Pseudoscopic View" because that is the view an observer will see in this position.

Then as he moves his head on farther to the right he again sees red and white mixed (or pink) until he reaches the position marked L-3 and R-3 where his eyes respectively follow radial lines 13 and 14 and he sees only true white since his right and left eyes both see only portions of the light-transmitting elements 3. He also sees the true stereo view in this position, as indicated by the brace so labeled. Again at positions L-4 and R-4 he sees portions of red and white elements and the pseudoscopic view again, while at positions L-5 and R-5 he has completed the optical cycle and his eyes again see only portions of red elements 2 and the true stereo view again. The same cycle obtains as an observer moves his head to the left.

With such an arrangement one may quickly find a correct position by observing the light seen through the transparent elements of the grating 5. If the light is pink (or part red and part white) he simply moves his head slightly either to the left or right until he sees either solid red or solid white. Then, having reached such a position, he lifts his eyes to the image and will see the true stereoscopic view.

Fig. 4 shows another type of stereoscopic image which may occupy the position of the image 1 of Fig. 1. (This image is called image B in my Patent No. 2,631,496, March 17, 1953, "Stereoscopic Viewing Methods and Apparatus.") This is an image comprising right and left eye elements which possess contrasted directions of polarization forming a cross-polarized pattern. Such an image is viewed through a polarizing screen which has polarizing elements corresponding in pattern to that of the said image B.

The device previously disclosed comprising the elements 2 and 3 (Figs. 1 and 3) and the grating 5 (Figs. 2 and 3) will operate with respect to such an image B and polarizing screen in identically the same manner as that disclosed with respect to the image 1 (Fig. 1) and the viewing screen indicated with respect to that image in the above description.

It is not essential that the elements 2 and 3 be spaced from the image as shown in Fig. 1: they may be adjacent the image as shown in Fig. 4; however spacing is preferable.

Figure 5:
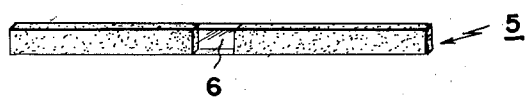
Fig. 5 shows another form the part of the detector device shown in Fig. 2 may take with similar results.

Also where in Fig. 2 the grating is shown as having a plurality of transparent elements 6, only one transparent element 6 may be used and the rest of the device be made opaque as indicated in Fig 5.

If a grating of the form shown in Fig. 2 is used, the grating may be made by opaquing all of the surface of some light-transmitting material such as glass or transparent plastic, except the areas which are to become the transparent elements 6.

While if a grating of the form indicated in Fig. 5 is used, a transparent strip or hole in some opaque material will serve the purpose. This opaque material may be the control board of a television receiver. But if so, care must be taken not to obscure the view of the observer through the strip or hole by the edge of the thickness of the control board. This may be avoided by a 45° angle cut-out at the transparent area.

Any modification of the device may be used as long as the transparent elements 6 (or element as in Fig. 5) are in the proper plane, are of the proper width, and not obscured in any way to the eyes of an observer.

The elements 2 and 3, Fig. 1, 3 or 4, also the elements 6, Fig. 2, 3 or 5, may be rectangular strips, square, round or other shapes. Also if a stereoscopic image of a checkerboard pattern or any other pattern is used instead of the image 1, Fig. 1, or image B, Fig. 4, this need not alter the operation of the device herein disclosed in any way.

Other color combinations for the elements 2 and 3 of the view detector may be more desirable than red and white; for example red and blue elements may be more preferable. Any color combination for these elements (even red and black or black and white) fall within the scope of the invention.

A highly preferred modification of the invention is possible when a lenticulated screen is used in the viewing of either the image of Fig. 1 or that of Fig. 4 in the manner disclosed in my previously mentioned co-pending application Serial No. 339,566, filed March 2, 1953. This modification of the invention will simply consist of the combining of a lenticulated screen with the part of the stereo view detector shown in Fig. 2, or with the modification shown in Fig. 5.

Figure 6:
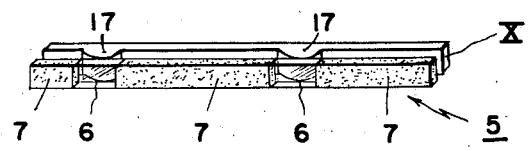
Fig. 6 shows the portion of the detector device of Fig. 2 combined with a lenticular screen.
Figure 7:
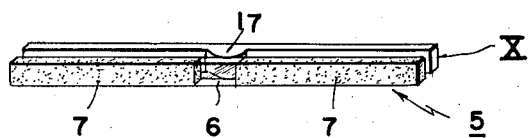
Fig. 7 shows the portion of the detector device of Fig. 5 combined with a lenticular screen.

Fig. 6 shows the grating 5 of Fig. 2 combined with the lenticulated screen X with lenticles 17 superimposed with the transparent elements 6, while Fig. 7 shows such a lenticulated screen with a lenticle 17 superposed with the transparent element 6. The relationship of lenticles to elements 2 and 3 (Fig. 1 or 4) is identical with that of the transparent areas 6 (Fig. 2 or 5) to the elements 2 and 3.

The advantage of this preferred modification just disclosed is that the increased depth of "viewing range" and increased "viewing angle" accomplished by utilizing a lenticular screen in the viewing process (see above-cited co-pending application for full disclosure of the advantages of lenticular screens for viewing such images) is duplicated in the use of such lenticular screens in the stereo view detector, in that the "depth of viewing range" and "viewing angle" for seeing the red or white elements 2 and 3 are equal to said "range" and "angle" in the image viewing process.

Also instead of the colored light-transmitting elements disclosed above, light-transmitting elements of retardation material designed to produce colored effects when transmitting polarized light may be substituted. Or variations of this principle may be resorted to within the scope of the invention.

Other modifications of the invention may be resorted to without departing from the scope thereof.

I claim:

1. In a free vision stereoscopic viewing system, the combination of a first light filtering unit comprising a plurality of light transmitting elements, the said elements occupying a plane in the plane of an image plane where a pair of stereoscopically related pair of images appears in the form of right and left eye adjacent image elements, each of said light transmitting elements being twice the width of a given image element and coinciding vertically with a pair of adjacent image elements, alternating light transmitting elements consisting of red transparent or translucent material, the light transmitting element intervening between said alternating transmitting elements consising of transparent or translucent spaces through which white light may pass, a second light filtering unit positioned before said light transmitting elements and spaced therefrom the same distance as the viewing screen is positioned with respect to said image plane and comprising alternating opaque and transparent elements and occupying a plane including the plane of said viewing screen for viewing said image stereoscopically, the opaque elements of said second light filtering unit being three times the width of the elements of the viewing screen, while the transparent elements are equal in width to the width of a given element of the viewing screen, and a light source for illuminating the said first light transmitting elements, the said light transmitting elements and opaque and transparent elements cooperating together to serve as a guide to the eyes of an observer to the true stereoscopic view and to its correct position, when the right eye of said observer is in a position to see the right eye stereoscopic view on said viewing screen and the left eye of said observer is in a position to see the left eye stereoscopic view on said viewing screen, and both the right and left eyes of said observer looking through the transparent elements of said second light filtering unit will see either all red or all white light.

2. The combination of claim 1, the said light transmitting elements comprising units of one color alternating with transparent units.

3. The combination of claim 1, the said opaque and transparent elements comprising a single opaque unit and a single transparent unit, and each of the said light transmitting elements are approximately twice the width of one of the said transparent units.

4. The combination of claim 1, the said opaque and transparent elements comprising a plurality of opaque units alternating with transparent units, the said transparent units each being superimposed respectively with lenticular elements.

5. The combination of claim 1, the said light transmitting elements comprising retardation material.

6. The combination of claim 1, the said viewing screen being spaced from said image plane such a distance, and from the viewpoint of an observer such a distance that the angle from a point at the image plane subtended by the eyes of said observer approximates the angle from said point that is subtended by the horizontal width of one of the unit optical elements of the viewing screen, while at the same time the widths of the unit stereoscopically related image elements are so proportioned to the widths of the said optical elements of the viewing screen that the angle from the pupil of either eye of said observer which is subtended by the horizontal width of one of the said optical elements of the viewing screen will be approximately subtended by the horizontal width of one of the said image elements.

References Cited in the file of this patent

UNITED STATES PATENTS 2,307,276    Keyzer  ---------------- Jan. 5, 1943